March 1, 1949.  D. D. GRIEG  2,462,860
PULSE TRANSLATOR

Filed March 19, 1945  2 Sheets-Sheet 1

INVENTOR.
DONALD D. GRIEG
BY
*Percy P. Lantzy*
ATTORNEY

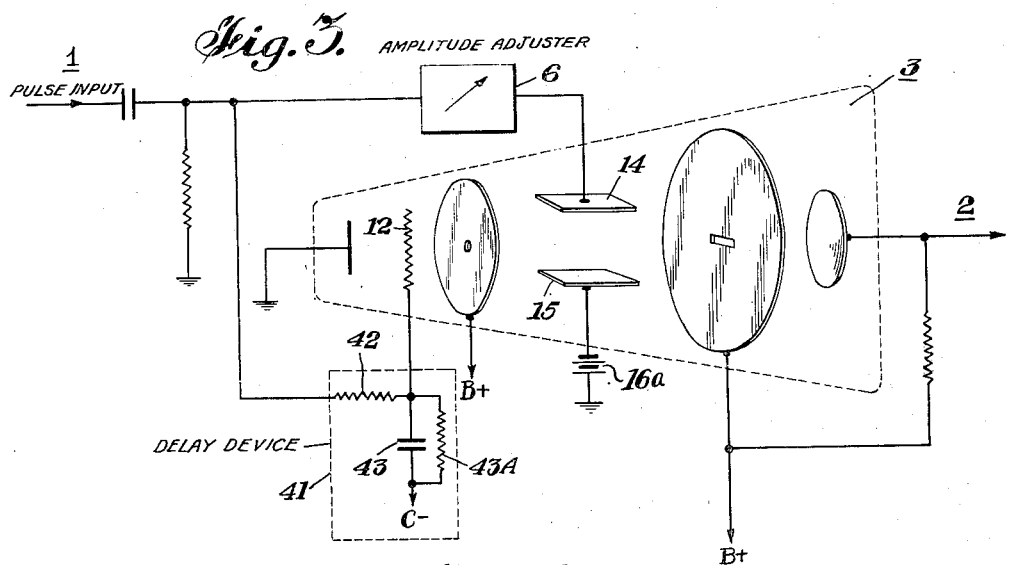
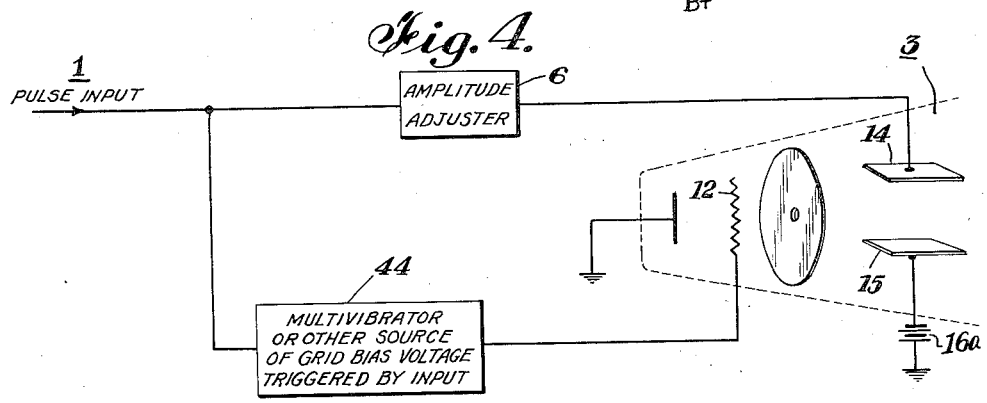
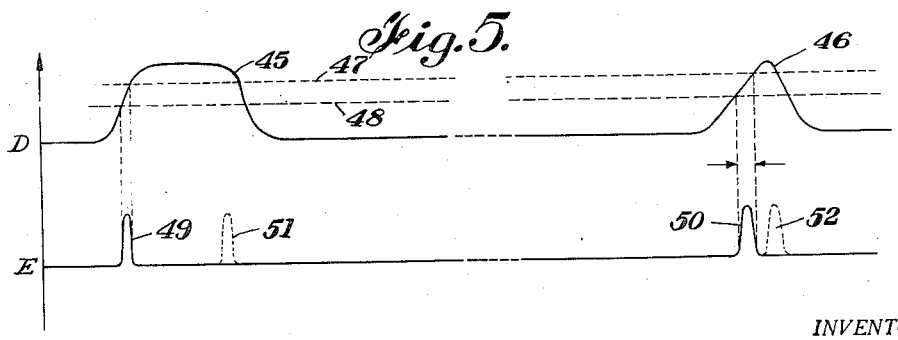

Patented Mar. 1, 1949

2,462,860

UNITED STATES PATENT OFFICE 2,462,860

PULSE TRANSLATOR

Donald D. Grieg, Forest Hills, N. Y., assignor to Federal Telephone and Radio Corporation, New York, N. Y., a corporation of Delaware Application March 19, 1945, Serial No. 583,590

14 Claims. (Cl. 250—27)

This invention relates to pulse repeaters and in particular to pulse translators or pulse circuits.

An important object of the invention is to produce a pulse repeater in which narrow pulses are produced from wide pulses.

A further object is to provide apparatus which may be designed to produce a series of pulses of uniform width occurring in rhythm with input pulses having different widths or having variously distorted wave forms, or to produce narrow pulses of uniform width from uniform wider pulses.

A still further object is to control the width of the pulses in the output of the repeater by controlling the amplitude of the input pulses, and to produce narrower output pulses as the amplitude is increased.

An ancillary object is to regulate the width of the output pulses by adjusting the slope of wave form of the input pulse.

A further object is to utilize the advantageous operational features of a beam deflector tube in carrying my purposes into effect.

A specific object is a pulse narrower in which the energy of the input pulse is used to block the tube after one sharp output pulse has been formed but before cessation of the input pulse.

Other objects and possible uses of the invention and a better understanding thereof can be derived from the following description of embodiments of the invention and the accompanying illustrative drawings, in which:

Fig. 3 is a view similar to Fig. 1 showing a second embodiment in which the blocking potential for the tube is derived directly from negative input pulses;

Fig. 4 represents in block diagram a third embodiment in which a separate source of grid biasing voltages, such as a multivibrator, is triggered by the incoming pulse;

Fig. 5 shows a set of curves representing the effect of the slope of the input pulse in controlling the width of the output pulse.

A preferred embodiment of my invention comprises electron discharge apparatus of the beam deflection type in which a tube with an apertured barrier electrode is used to produce sharp, narrow pulses in its output, of the same frequency as and automatically synchronized with respect to the input pulses.

In order to get narrow width pulses in the output, a well focused spot beam is used, or a thin beam preferably having a vertical dimension so small that the beam fits within the edges of the aperture. A thicker beam requires more time to traverse the aperture at a given speed and produces an output pulse of slower build up and decay time.

In the absence of a signal the beam axis of the tube is focused to some point above or below the aperture in the barrier, and the normal biases on the tube may be such that the beam itself is not formed or is of ineffective magnitude until a signal is received. Upon receipt of a pulse the beam axis is swept rapidly across the aperture, in one direction as the pulse builds up and in the other direction as the pulse current falls to zero. The beam itself is, however, suppressed as the beam axis crosses the aperture on the return movement.

The energy of the input pulse is utilized both to produce the deflection of the beam and also to effect its suppression. For this latter purpose a network is connected to the tube which derives a blocking potential or both a beam controlling potential and a beam blocking potential either from the input pulse or under control of the input pulse, and applies it to the tube over the proper time interval. Considerable leeway is permissible in the timing; the blocking may be initiated at any instant after the beam has crossed the aperture the first time but it must continue at least until the beam axis has crossed the aperture the second time in the reverse direction. In one extreme case and for some purposes of my invention, the beam may be permitted to pass only while the beam axis is traversing the aperture in the return direction. Or from a broad viewpoint of my invention, the relative time intervals of suppression and passage of the beam may have any other intermediate value just so long as formation of one output pulse properly related to the input pulse is permitted.

Figure 1:
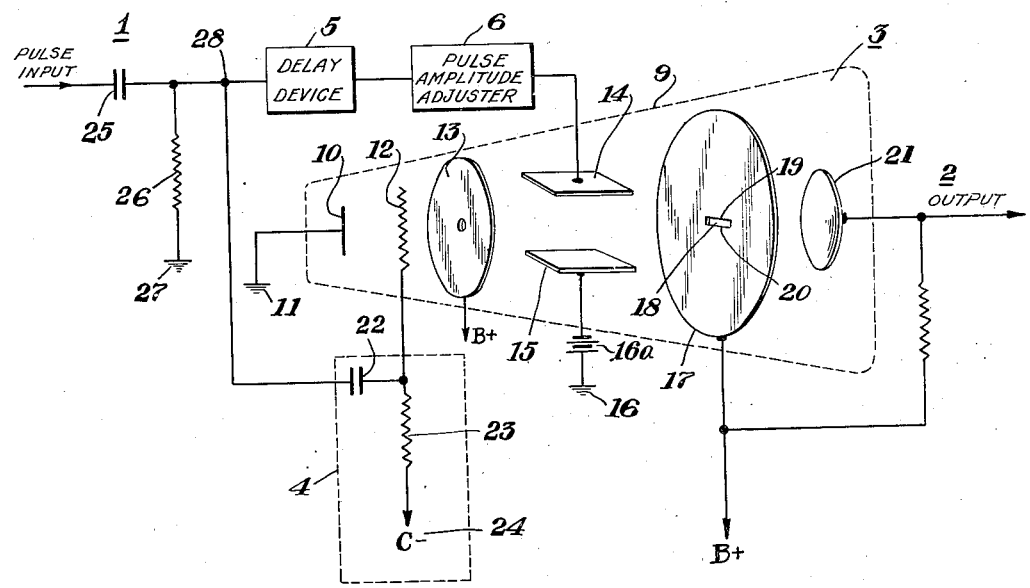
Fig. 1 represents partly in block diagram and partly in perspective, one embodiment of the invention in which the blocking potential for the beam deflection tube is derived from a rough differentiator circuit, shown as a simple resistance-capacity network.

In Fig. 1, the pulse input circuit is represented generally at 1, the pulse output circuit at 2, the beam deflection tube at 3 and a rough differentiator circuit at 4. A delay device for delaying the time of occurrence of the input pulse series is represented at 5 and a pulse amplitude adjusting device at 6. These are the fundamental elements of the system and may take various forms, as will be evident as the description proceeds. Under certain circumstances the delay device may be eliminated; the pulse amplitude adjuster may also be eliminated where its function is performed by apparatus in the circuit preceding the beam deflection tube. The term "rough differentiator" is here applied in a broad sense to cover any circuit for deriving from the energy of the input pulse a wave form having the general nature of a derivative wave. This will be explained more fully in connection with curve B of Fig. 2.

The beam deflection tube is shown as comprising an envelope 9 represented in dash lines and the following electrode structure in the order named: a cathode 10 preferably of the thermionic type grounded at 11, a grid or beam control electrode 12, a first anode 13 for accelerating the electrons and concentrating the beam, a pair of deflection plates 14 and 15 arranged vertically one above the other with the lower plate 15 grounded at 16, in the usual fashion, a barrier electrode 17 having a narrow aperture 18 arranged centrally in the beam path and having upper and lower edges 19 and 20, respectively, which intersect a deflection plane perpendicular to the planes of the deflection plates 14, 15 and a collector anode 21 represented here as a plate behind the aperture 18, on the opposite side of the barrier electrode 17 from the cathode 10.

The electron beam tube may take any one of a number of forms provided the electrodes are arranged to perform the functions indicated. For example, the output electrodes may include electrode structure of the secondary emission type or of the electron multiplier type, where desired. Accordingly the showing of the output electrode as a simple collector anode behind the barrier electrode 17 is not to be taken as limiting the invention to the use of a tube having this particular structure. Likewise, other types of beam deflecting means such as those using magnetic fields could be used where possible.

Only so much of the tube connections are illustrated as is necessary to explain the operation of the circuit. Thus, the connection of the barrier electrode 17 and collector anode 21 to a source of positive potential, marked "B+", is indicated, but the complete circuits are not shown.

The rough differentiator 4 may comprise a simple resistance-capacity network as illustrated in Fig. 1, composed of condenser 22 and resistor 23, the latter grounded at 24. The common terminal of condenser 22 and resistor 23 is connected to the grid 12 of tube 3 and the opposite terminal of the condenser 22 is connected to the pulse input circuit.

The pulse input 1 is illustrated an connected to the tube circuits through a resistance capacity coupling known in itself and comprising condenser 25 and a resistance 26 grounded at 27. At a point 28 beyond the coupling to line, the pulse input circuit is branched, to supply input pulses to two paths, one by way of the delay device 5 and pulse amplitude adjusting means 6 to the deflection plates 14, 15 of tube 3 and the other by way of the differentiator circuit 4 to grid 12 of tube 3.

The operation of the circuit of Fig. 1 is as follows:

The beam axis of the tube is normally focused to a point above or below the aperture 18 depending on the polarity of the deflecting pulse. This may be accomplished by applying a suitable steady potential to the deflection plates from a direct current source 16a. When the input pulse applies a potential to deflection plate 14 of the tube, the pulse will cause the beam to sweep past the aperture edges 19, 20. The beam axis will be restored to its initial position upon cessation of the pulse. As it is restored it will cross the aperture again in the opposite direction. If the beam remained effective at all times an output pulse would be produced each time the beam crossed the aperture.

However, the differentiator 4 is provided for the purpose of supplying a negative bias to block the beam, preventing the formation of an output pulse upon return movement of the beam axis to its normal position after deflection. The differentiator also serves the additional purpose of supplying a positive bias to bring the beam up to full strength by the time it crosses the aperture upon its deflection away from normal position. The leading edge of the input pulse produces the positive bias potential and the trailing edge produces the negative bias potential, at the terminal of the differentiator circuit connected to the grid. Both biasing potentials must be properly timed to be effective as the beam axis crosses the aperture, the positive bias as the beam moves from its initial position and the negative bias as it returns to its initial position. The positive bias must also be so adjusted as to magnitude as to assure passage of an output pulse of proper amplitude.

The width of the output pulse is dependent on the width of the aperture measured in the line of deflection of the beam, on the corresponding dimension of the beam and on the speed at which the beam crosses the aperture. In order, therefore, to get narrow output pulses the dimensions and arrangement of the aperture and the size of the beam in the plane of the aperture must be properly chosen. In addition, the tube, properly constructed and properly biased, must also be so operated as to control the speed at which the beam is deflected across the aperture. Two factors may control the speed of traverse. In the case of input pulses having a leading edge which is substantially vertical, the beam forming voltage is applied substantially instantaneously and the speed is greater as the applied voltage increases. Accordingly, amplifying the wave will increase the speed and narrow the output pulse. If the input pulse is sinusoidal in form, amplification will also increase the speed of deflection. In this case the wave of greater peak amplitude has a higher rate of change of voltage, that is, a greater slope. The slope of the wave will affect the speed, a wave of greater slope giving a narrower output pulse.

It is obvious that the fundamental reason why the circuit can be used as a pulse narrower is the fact that output pulse current flows only during a part of the time that an input pulse is flowing. By suppressing the second of each pair of pulses that would be produced if the differentiator were not present the device serves to repeat a pulse series without changing the frequency of the pulses or their relative spacing provided there is no appreciable difference in the slopes of the leading edges of the individual input pulses. Thus, pulses of variable width under these circumstances may be repeated as narrow pulses of constant width and unchanged frequency. The narrowing operation produces an output pulse which corresponds in time position with the leading edge of the wide pulses. Accordingly, pulses of the fixed leading edge type may be repeated as uniformly spaced, narrow pulses of desired amplitude.

Figure 2:
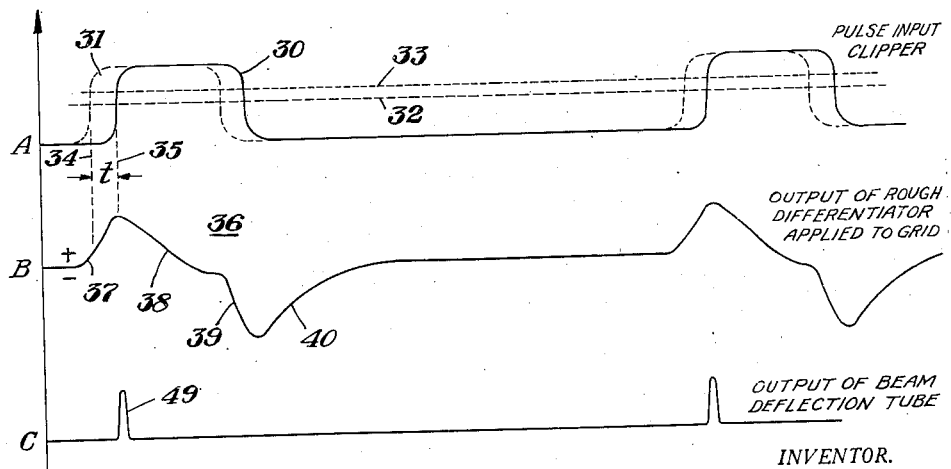
Fig. 2 shows a set of curves used in explaining the operation of the circuit.

In order to explain in greater detail the action of the delay device 5 in timing the circuit, reference is made to Fig. 2. In this figure, curve A represents pulse input, curve B the output of the differentiator circuit applied to grid 12, and curve C the output of the beam deflection tube. On curve A the full line wave form 30 represents the pulse applied to grid 12 and the dotted line wave form 31 the input pulse before it is delayed. A pair of parallel horizontal dash lines 32, 33 intersecting wave forms 30 and 31 illustrates the clipper action of the aperture and is here designated the "equivalent gate" of the tube. The heights of these lines above the zero axis represent the sweep voltages at which the beam enters and leaves the aperture. For the leading edge of the input pulse the lower line 32 represents the sweep voltage as the beam enters the aperture and the higher line 33 the voltage at which the beam leaves the aperture.

A pair of vertical lines 34 and 35 between curves A and B are drawn through the points of intersection of line 32 with wave forms 30 and 31. The space $t$ between lines 34 and 35 represents the time delay introduced between the input pulse applied to the circuit of the differentiator 4 and the input pulse applied to the deflection plates 14, 15. This delay is produced artificially by delay device 5, to the extent that it is not inherent in the electrical constants of the circuits. Its purpose is to permit the grid 12 to acquire a sufficiently positive bias from the output voltage of differentiator 4 so that a beam of proper electron density will flow as the beam axis is swept across aperture 18. Preferably the constants of the differentiator are adjusted so that the grid receives its peak positive bias while the beam passes the aperture.

The timing of the delayed input pulse with respect to the derived wave form is represented on curve B of Fig. 2. Curve B shows in an approximate form the wave form of the bias supplied by a rough differentiator circuit of the type illustrated in Fig. 1. This wave form 36 supplies a positive bias potential as the beam axis sweeps across the aperture from its initial position, followed by a negative bias potential. If a beam normally flows in the tube this positive bias serves to control its density. If the beam is normally blocked this positive bias counteracts the normal blocking bias and permits formation of the beam as well as controlling its density.

Wave form 36 may be analyzed as comprising four portions, 37—38—39—40, of which 37 and 39 play significant roles. The part 37 represents a sharp rise in positive voltage produced at the leading edge of the input pulse, and portion 39 a corresponding peak of negative voltage produced at the trailing edge of the pulse. The wave form 36 is shown smoothed out somewhat by the constants of the circuit. The intermediate portion 38 represents the decreasing potential drop across resistance 23 as condenser 22 approaches full charge. The shape of the part 38 is not important since it represents the bias on grid 12 for the interval between the two aperture crossings of the beam axis. Part 40 represents the time interval during which the condenser 22 discharges and the blocking bias on grid 12 disappears.

The curve C represents the narrow output pulses produced in the output circuit of tube 3. As shown a single pulse 49 is produced for each input pulse, the spacing between the two narrow output pulses corresponding to the spacing between the leading edges of successive input pulses. The shape and amplitude will depend on various factors previously discussed. If a sharp output pulse is desired care should be taken that the beam is properly focused. If the beam is wide enough to overlap the aperture considerably in the line of deflection, the pulse produced will be wider and flat topped. Generally speaking, the amplitude of the output pulse depends on the density of the beam and may be controlled by regulating the effective grid bias; the width of the output pulse depends on the speed of deflection and may be regulated by adjusting the amplitude or slope of the leading edge of the input pulse; the shape of the output pulse depends on the characteristics of the beam and may be controlled by proper choice of tube and tube circuit constants.

Referring to Fig. 3, the differentiator circuit of Fig. 1 is here replaced by a delay circuit 41. The circuit of Fig. 3 is used where the input supplies pulses of negative polarity which may be applied to the grid in delayed form to suppress the beam after it has been deflected once across the aperture. In this case the beam is normally effective but is focused to one side of the aperture, the side opposite that which would be used for positive input pulses. Assuming that it is focused above the aperture 18 and that a negative input pulse applies a negative potential to deflection plate 14, then the delay introduced by device 41 must be such as to apply the delayed negative pulse to the grid before the beam axis reaches the aperture on its return sweep back to normal position. The operation is otherwise similar to that of Fig. 1. The shunt resistance 43A allows the charge on the shunt capacitance 43 to leak off and thus make the device receptive for the next pulse.

Although the delay device 41 is represented as comprising a series resistance 42 and shunt capacity 43, and shunt resistance 43A this showing is merely representative and any suitable delay circuit may be used.

The system of Fig. 4 differs from those of Figs. 1 and 3 in that a separate source 44 of blocking potentials is provided. This source is triggered by each incoming pulse to supply blocking potentials or both beam controlling and blocking potential at the proper time, in accordance with the principles of the invention as already explained. A multi-vibrator may provide the blocking potentials, but any source is suitable which may be made to supply a blocking voltage at the proper time. If the source provides only negative pulses the tube must be operated with the beam normally effective, but if the source provides both positive and negative pulses as does the differentiator circuit of Fig. 1, then the tube may be operated with the beam normally ineffective, a positive pulse being applied to bring the beam to full density as it is deflected across the aperture in the barrier electrode. Since the operation of the circuit of Fig. 5 is very similar to that of the circuit of Fig. 1 a detailed description of its operation is believed to be unnecessary.

Fig. 5 shows two curves D and E. On curve D a flat-topped input pulse 45 and a sinusoidal input pulse 46 of approximately the same maximum amplitude are shown, a pair of spaced horizontal lines representing the clipper action of the aperture in the barrier electrode of tube 3. Curve E represents in full lines the pulses 49 and 51 which are actually produced at the leading edges of the rectangular and sinusoidal pulses, respectively. The dotted lines 51 and 52 represent the pulses produced at the trailing edges of pulses 45 and 46 if no blocking of the tube occurs. The pulses 51 and 52 do not appear in the output circuit since provision is made for suppressing them by the blocking bias from the differentiator of Fig. 1 or an equivalent means. It will be noted that the rectangular pulse 45 with the steeper slope at the aperture "gate" will produce narrower pulses 49, 51 spaced farther apart than will a sinusoidal pulse of the same peak amplitude, since the latter has less slope at the aperture "gate."

It will be apparent that in the embodiments of the invention illustrated, the wave form, the amplitude and the width of the output pulses do not necessarily correspond with those of the input pulses but may be controlled by them to the extent indicated. However, the frequency of the input and output pulses is the same due to the fact that the second of each pair of pulses produced by the input pulse is suppressed. Moreover, with this invention a series of uniform pulses may be shifted as a whole in time position as they are narrowed, the relative time positions of the individual pulses remaining unchanged.

Various possible changes in the circuits will be obvious to those skilled in the art. For example, the function of varying the amplitude or of adjusting the slope of the input pulse may be performed in apparatus preceding the deflection tube circuits rather than in the path between the pulse input 1 and the deflection plate 14. The adjustment may be made manually or automatically by a variable amplifier placed in either position. It is also possible to place the variable amplifier or pulse amplitude adjuster either before or after the delay device 5.

I claim:

1. A system for repeating pulses comprising a beam deflection tube with input and output circuits therefor, and having an output electrode beam collecting means and a barrier electrode provided with an aperture positioned across the beam deflection plane, means for generating and directing an electron beam toward the output electrode, means to cause deflection of said beam across said aperture in a fixed time relation with respect to the occurrence of each input pulse, means responsive to a direct current voltage component of a given polarity and derived from each input pulse to control the intensity of the beam to produce in said output circuit a corresponding pulse, and means controlled by a direct current voltage component of the opposite polarity and derived from the input pulse and synchronized with the input pulse to prevent production of an additional pulse in the output circuit.

2. A system according to claim 1 wherein the input circuit has means for deriving from the input pulse a control voltage and for applying the same in synchronism with the deflection voltage to suppress the beam and thereby prevent the production of additional pulses in response to said input pulse.

3. A pulse repeating circuit comprising an input circuit for pulses, a beam deflection tube comprising beam forming, beam controlling, beam deflecting and beam collecting electrode structure and a barrier electrode in the path of the beam having a pair of edges across which the beam moves successively upon deflection, means for deriving from the input pulses a variable voltage wave having beam passing and beam blocking values, means for applying the input pulse to the deflecting structure and the derived wave to the beam controlling structure in such time relation that a beam passing potential is effective simultaneously with the leading edge of an input pulse and a beam blocking potential becomes effective prior to cessation of said input pulse.

4. A pulse repeating circuit comprising an input circuit for pulses, a beam deflection tube comprising beam forming, beam controlling, beam deflecting and beam collecting electrode structure and a barrier electrode in the path of the beam having a pair of edges across which the beam moves successively upon deflection, means for deriving from the input pulses and applying to the beam controlling structure a varying voltage wave having beam passing and beam blocking values and means for delaying the input pulses and applying them to the deflecting structure.

5. A pulse repeating circuit comprising an input circuit for pulses, a beam deflection tube including beam forming, beam controlling, beam deflecting and beam collecting electrode structure and a barrier electrode in the path of the beam provided with an aperture having a pair of edges across which the beam moves successively upon deflection, means for deriving from the input pulses a variable voltage wave having beam blocking values, means for amplifying the input pulses and applying them in amplified form to the deflecting structure so as to regulate the speed at which the beam is deflected across the aperture in the barrier electrode, means for applying the derived wave to the beam controlling electrode structure so timed that blocking values of the derived wave are effective before cessation of an input pulse.

6. A pulse repeating circuit comprising an input circuit for pulses, a beam deflection tube including beam forming, beam controlling, beam deflecting and beam collecting electrode structure and a barrier electrode in the path of the beam having a pair of edges across which the beam moves successively upon deflection, means for deriving from the input pulses a varying voltage wave having beam permitting and beam blocking values, means for regulating the amplitude of the input pulses and for applying them to the deflecting structure, means for applying the derived wave to the beam controlling structure so that a beam permitting potential is effective upon receipt of an input pulse and a beam blocking potential becomes effective prior to cessation of the input pulse.

7. A pulse repeating circuit including an input circuit for pulses, a beam deflection tube having beam forming, beam controlling, beam deflecting and beam collecting means and a barrier electrode in the path of the beam having a pair of edges intersecting a deflection plane of said beam, means for applying the input pulses to the deflecting electrode means, means for deriving under control of the received input pulse a varying voltage wave having beam blocking values, said last mentioned means being self-synchronizing with respect to the pulse applied to the deflecting means to initiate beam blocking values during intervals intermediate the leading and trailing edges of the said applied pulse, and means for applying said voltages having beam blocking values to said beam controlling means to cause blocking of the beam.

8. A pulse width converter comprising an electron discharge device of the beam deflection type having beam forming, beam controlling, beam deflecting and beam collecting means and an apertured barrier electrode in the path of the beam, means for initially focusing the beam to a point to one side of the aperture, a source of input pulses for the beam deflecting means for deflecting the beam along a line passing through the aperture, means for controlling the speed of traverse of the beam across the aperture, means under control of an input pulse for preventing passage of the beam across the aperture in the opposite direction, and a pulse output circuit connected to the beam collecting means.

9. A pulse width converter comprising an electron discharge device of the beam deflection type having beam forming, beam controlling, beam deflecting and beam collecting means and an apertured barrier electrode in the path of the beam, means for initially biasing the beam to a point to one side of the aperture edge, a source of input pulses for the beam deflecting means for deflecting the beam back and forth across the aperture in response to each incoming pulse, and means under control of the input pulse for suppressing the beam on movement of the beam in one direction across the aperture.

10. A pulse width converter comprising an electron discharge device of the beam deflection type including beam forming, beam controlling, beam deflecting and beam collecting electrode structure and an apertured electrode in the path of the beam, means for initially focusing the beam to a point at the side of said aperture, a source of input pulses for the beam deflecting electrode structure for deflecting the beam along a line passing through the aperture, means for controlling the amplitude and time phase of the pulses applied from said source to the beam controlling electrode structure, means for modifying the input pulses and applying them in modified form to the controlling electrode structure so as to produce therefrom blocking potentials for the beam, and a pulse output circuit connected to said beam collecting electrode structure for receiving the pulses converted by said electron discharge device.

11. A pulse width converter comprising an electron discharge device of the beam deflection type having beam forming, beam controlling, beam deflecting and beam collecting electrode structure and an apertured barrier electrode in the path of the beam, means for normally focusing the beam to a point on the barrier electrode to one side of said aperture, a source of input pulses for the beam deflecting electrode structure for deflecting the beam back and forth across the aperture, means for modifying the input pulses and applying them in modified form to the controlling electrode structure so as to produce therefrom delayed pulses as blocking potentials for the beam, and a pulse output circuit connected to said beam collecting electrode structure.

12. A pulse width converter comprising an electron discharge device of the beam deflection type comprising beam forming, beam controlling, beam deflecting and beam collecting electrode structure and an apertured barrier electrode in the path of the beam, means for normally focusing the beam to a point on the barrier electrode to one side of said aperture, a source of negative pulses connected to said beam deflecting structure, means for delaying the received negative pulses and applying them to said beam controlling structure in delayed form to provide delayed blocking potentials for said electron discharge device, and a pulse output circuit connected to said electron discharge device.

13. The method of operating a beam deflecting tube of the apertured barrier electrode type which comprises applying deflecting voltages to said tube under control of input pulses in such manner as to cause the beam of the tube to move from a position at one side of the aperture to a position at the other side, the movement being in one direction as the pulse builds up and in the opposite direction as the pulse decays, and while maintaining beam passage during movement in one of the directions suppressing the beam during its movement in the other direction.

14. The method of operating a beam deflection tube of the barrier electrode type which comprises focusing the beam to a point on the barrier electrode to one side of the aperture, deflecting the beam at a controlled speed from its position of initial focus to a position at the opposite side of the aperture by deflecting voltages derived from incoming pulses and preventing movement of the beam across the aperture when the deflecting voltage restores the beam to its position of initial bias, by blocking the beam with a delayed blocking potential derived from the deflecting voltage.

DONALD D. GRIEG.

REFERENCES CITED

The following references are of record in the file of this patent:

UNITED STATES PATENTS

| Number | Name | Date |
| --- | --- | --- |
| 2,011,920 | Terry | Aug. 20, 1935 |
| 2,096,653 | Soller | Oct. 19, 1937 |
| 2,191,185 | Wolff | Feb. 20, 1940 |
| 2,225,330 | Cage | Dec. 17, 1940 |
| 2,262,407 | Rath, Jr. | Nov. 11, 1941 |
| 2,365,476 | Knoop et al. | Dec. 19, 1944 |